United States Patent
Abilay et al.

(10) Patent No.: US 11,025,753 B2
(45) Date of Patent: Jun. 1, 2021

(54) METHOD AND DEVICE FOR INTER-PROCESS COMMUNICATION IN NETWORK

(71) Applicant: SAMSUNG ELECTRONICS CO., LTD., Suwon-si (KR)

(72) Inventors: Wilford Abilay, Makati (PH); Josen Daniel De Leon, Metro Manila (PH); Michael John Reyes, Metro Manila (PH)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 152 days.

(21) Appl. No.: 16/460,563

(22) Filed: Jul. 2, 2019

(65) Prior Publication Data

US 2020/0007663 A1 Jan. 2, 2020

(30) Foreign Application Priority Data

Jul. 2, 2018 (PH) .............................. 1-2018-000189
Jun. 10, 2019 (KR) ......................... 10-2019-0068264

(51) Int. Cl.
*H04L 29/06* (2006.01)
*G06F 9/54* (2006.01)
*H04L 29/08* (2006.01)
*H04L 12/44* (2006.01)

(52) U.S. Cl.
CPC .............. *H04L 69/08* (2013.01); *G06F 9/547* (2013.01); *H04L 12/44* (2013.01); *H04L 69/321* (2013.01); *H04L 2012/445* (2013.01)

(58) Field of Classification Search
CPC ....... H04L 29/06; H04L 69/08; H04L 69/321; H04L 12/44; H04L 12/66; H04L 41/022; H04L 2012/445
See application file for complete search history.

(56) References Cited

U.S. PATENT DOCUMENTS

| | | | |
|---|---|---|---|
| 5,652,885 A * | 7/1997 | Reed | G06F 9/544 713/1 |
| 9,098,367 B2 * | 8/2015 | Ricci | G06F 8/61 |
| 9,290,153 B2 * | 3/2016 | Ricci | G05D 1/0016 |
| 9,870,276 B2 | 1/2018 | Yeo et al. | |
| 2004/0250252 A1 * | 12/2004 | Khartabil | G06F 9/545 719/310 |
| 2005/0187979 A1 * | 8/2005 | Christensen | H04L 67/325 |
| 2009/0106774 A1 * | 4/2009 | Seshimo | G06F 9/54 719/313 |

(Continued)

FOREIGN PATENT DOCUMENTS

| | | |
|---|---|---|
| DE | 10 2014 225 802 A1 | 6/2016 |
| KR | 10-1584213 B1 | 1/2016 |

OTHER PUBLICATIONS

Communication dated Sep. 13, 2018, issued by the Intellectual Property Office in corresponding Philippines Application No. 1/2018/000189.

(Continued)

*Primary Examiner* — Sargon N Nano
(74) *Attorney, Agent, or Firm* — Sughrue Mion, PLLC

(57) ABSTRACT

A system for inter-process communication (IPC) in a network of a vehicle through a port for communication between a source application and a destination application.

18 Claims, 8 Drawing Sheets

(56) References Cited

U.S. PATENT DOCUMENTS

| | | | |
|---|---|---|---|
| 2009/0254664 A1* | 10/2009 | Wada | H04L 67/148 |
| | | | 709/227 |
| 2012/0166602 A1 | 6/2012 | Lee | |
| 2015/0222637 A1* | 8/2015 | Hung | H04L 63/20 |
| | | | 726/1 |
| 2015/0331422 A1 | 11/2015 | Hartung et al. | |
| 2017/0195471 A1* | 7/2017 | Jones | H04W 76/25 |
| 2018/0303003 A1* | 10/2018 | Meinhart | G06F 8/61 |
| 2019/0191471 A1* | 6/2019 | Yoshikawa | H04W 76/12 |
| 2019/0195642 A1* | 6/2019 | Mannan | G01C 21/3438 |
| 2019/0394097 A1* | 12/2019 | Ricci | G06F 3/017 |

OTHER PUBLICATIONS

Torsten Braun et al., "Vehicular Networking in the Recursive InterNetwork Architecture", IEEE 87th Vehicular Technology Conference, Jun. 6, 2018, (pp. 1-5).

\* cited by examiner

METHOD AND DEVICE FOR INTER-PROCESS COMMUNICATION IN NETWORK

CROSS-REFERENCE TO RELATED APPLICATIONS

This application is based on and claims priority under 35 U.S.C. § 119 Philippine Patent Application No. 1-2018-000189, filed on Jul. 2, 2018, in the Intellectual Property Office of the Philippines, and Korean Patent Application No. 10-2019-0068264, filed on Jun. 10, 2019, in the Korean Intellectual Property Office, the disclosures of which are herein incorporated by reference in their entireties.

BACKGROUND

1. Field

The disclosure relates to a method and device for inter-process communication (IPC) in a network, and more particularly, to a method and device for secure communication between an application and another application by using a network.

2. Description of Related Art

A communication protocol is a system of rules for exchanging messages between computers or telecommunication devices. Information exchanged between devices through a network is managed according to rules configurable by communication protocol specifications. To implement a networking protocol, a protocol software module interfaces with a framework implemented in an operating system of an electronic device. A transmission control protocol/Internet protocol (TCP/IP) model or an open systems interconnection (OSI) model may be used as the framework.

The above-mentioned existing communication protocol may not accept next-generation technologies due to latency and bandwidth requirements. In addition, implementation of the existing protocol is accompanied by a complicated physical wiring and use of a complicated topology. An Ethernet layer is a physical layer capable of solving the above-described problems, but requires an Internet Protocol (IP) address of each electronic control unit (ECU) with which a system desires to communicate, and is vulnerable to network attacks due to use of a dedicated port for a specific protocol.

Therefore, research into an inter-process communication (IPC) technology capable of solving the above-described or other problems or providing a useful alternative is required.

SUMMARY

Provided is a method and device for efficient and secure inter-process communication (IPC) in a network.

Provided is a computer program product including a computer-readable recording medium having recorded thereon a program for executing the method on a computer. The technical problems of the disclosure are not limited to the aforementioned technical features, and other unstated technical problems may be inferred from embodiments below.

Additional aspects will be set forth in part in the description which follows and, in part, will be apparent from the description, or may be learned by practice of the presented embodiments of the disclosure.

According to an embodiment of the disclosure, an electronic device includes a memory storing one or more instructions, and at least one processor configured to execute the one or more instructions to check validity of a registration request of a source application of the vehicle for communicating with a destination application of the vehicle, determine a port for the source application of the vehicle to communicate with the destination application of the vehicle, based on the validity of the registration request, transmit a communication request from the source application of the vehicle to the destination application of the vehicle through the port, and control communication between the source application of the vehicle and the destination application of the vehicle based on the communication request.

The registration request may include at least one of a name of the destination application or a desired quality of service (QoS).

The at least one processor may be further configured to execute the one or more instructions to register the source application in a network through a first library of the source application based on the registration request.

The at least one processor may be further configured to execute the one or more instructions to recursively forward the communication request to one or more communication stacks until the communication request reaches a physical layer.

The at least one processor may be further configured to execute the one or more instructions to recursively transmit the communication request to one or more Ethernet switches until the communication request reaches a processor for controlling the destination application.

The at least one processor may be further configured to execute the one or more instructions to dynamically determine the port.

The at least one processor may be further configured to execute the one or more instructions to determine a port identifier indicating the determined port, and wherein the port identifier indicating the determined port includes a port number dynamically assigned by a second library of the source application.

The at least one processor may be further configured to execute the one or more instructions to transmit the registration request from a first library of the source application to a second library of the source application.

The registration request may include an encrypted name of the destination application and an authentication key.

The electronic device may further include a communicator configured to communicate with an external device.

According to another embodiment of the disclosure, a vehicle includes the electronic device.

According to another embodiment of the disclosure, a method includes checking validity of a registration request of a source application of a vehicle for communicating with a destination application of the vehicle, determining a port for the source application of the vehicle to communicate with the destination application of the vehicle, based on the validity of the registration request, transmitting a communication request from the source application of the vehicle to the destination application of the vehicle through the port, and controlling communication between the source application of the vehicle and the destination application of the vehicle based on the communication request.

According to another embodiment of the disclosure, an electronic device and a method of operating the electronic device include an electronic device and method for implementing an in-vehicle network. The method may include registering a source application in a network through a registration request and an automotive open system architecture (AUTOSAR) library, determining a port number for communicating with the destination application, based on authentication of the registration request, transmitting, by the source application, a communication request to the destination application through the determined port, processing, by a recursive internetwork architecture (RINA) library of the source application, the communication request, and recursively forwarding the communication request to one or more low-level RINA distributed IPC facilities (DIFs) until the communication request reaches an Ethernet layer, transmitting the communication request through one or more Ethernet switches until the communication request reaches a destination electronic control unit (ECU), and recursively forwarding the received communication request to one or more high-level RINA DIFs until the communication request reaches an AUTOSAR library of the destination application and the destination application.

According to another embodiment of the disclosure, a system includes a source application in a first electronic control unit (ECU) and a destination application in a second ECU, among a plurality of ECUs. The source application may include an automotive open system architecture (AUTOSAR) for communicating with the destination application. To implement a recursive internetwork architecture (RINA) protocol, the system may include one or more distributed IPC facilities (DIFs) corresponding to the plurality of ECUs, one or more Ethernet switches of Ethernet layers for connecting one or more automotive elements to the plurality of ECUs, and a backbone switch for interconnecting the one or more Ethernet switches.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
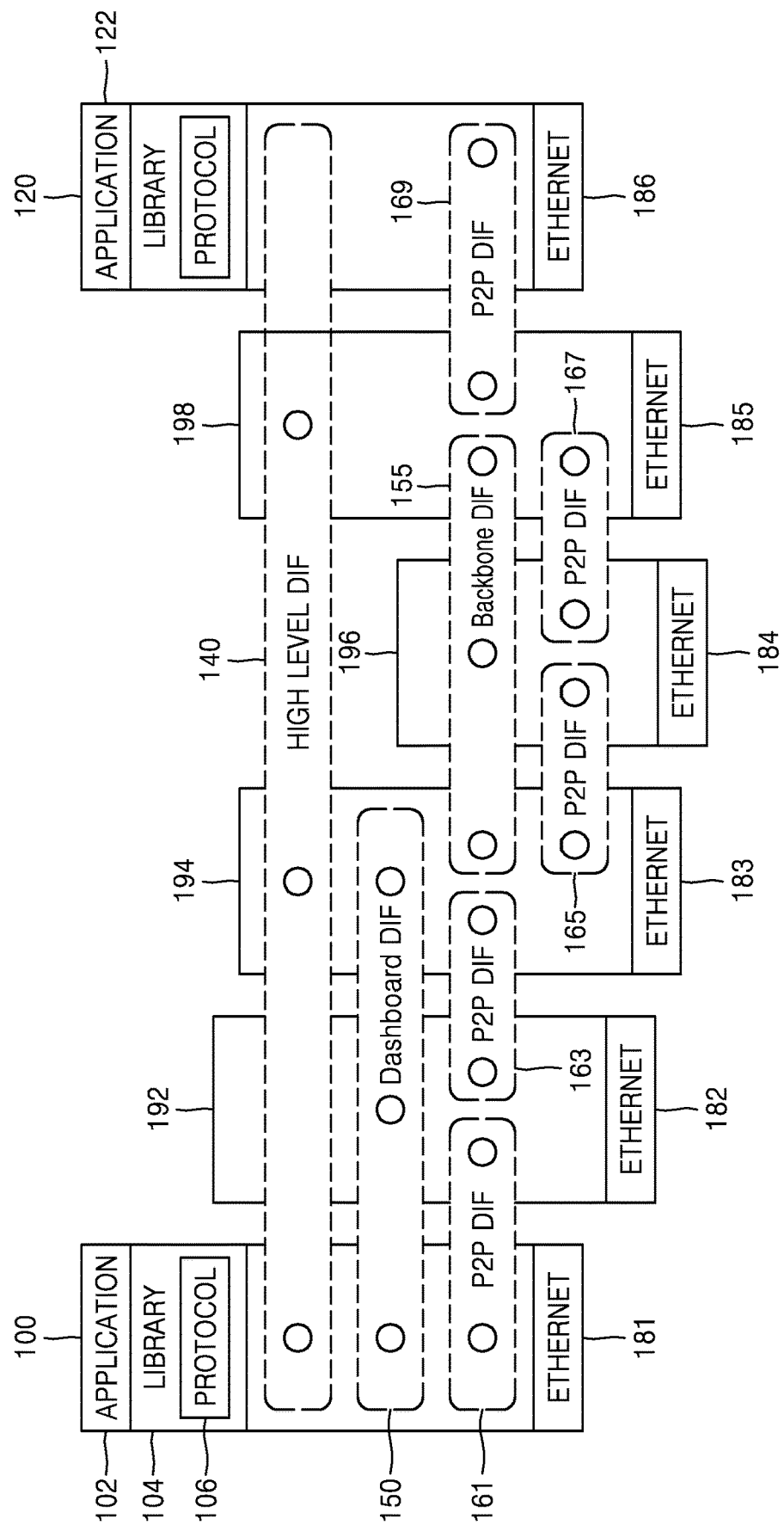
FIG. 1 is a block diagram of a system for communication between a source application and a destination application in a network, according to an embodiment of the disclosure.

Hereinafter, the disclosure will be described in detail by explaining embodiments with reference to the attached drawings. The disclosure may, however, be embodied in many different forms and should not be construed as being limited to the embodiments of the disclosure set forth herein. In the drawings, parts not related to embodiments of the disclosure are not illustrated for clarity of explanation, and like reference numerals denote like elements throughout.

Although the terms used in the following description are selected, as much as possible, from general terms that are widely used at present while taking into consideration the functions obtained in accordance with the disclosure, these terms may be replaced by other terms based on intentions of one of ordinary skill in the art, customs, emergence of new technologies, or the like. In a particular case, terms selected by the applicant may be used and, in this case, the meanings of these terms may be described in corresponding parts of the disclosure. Therefore, it is noted that the terms used herein are construed based on practical meanings thereof and the whole content of this specification, rather than being simply construed based on names of the terms.

The singular forms "a", "an", and "the" are intended to include the plural forms as well, unless the context clearly indicates otherwise. The terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof. In particular, integers are provided below to promote understanding, and embodiments of the disclosure should not be construed as being limited to the integers.

Throughout the disclosure, the expression "at least one of a, b or c" indicates only a, only b, only c, both a and b, both a and c, both b and c, all of a, b, and c, or variations thereof.

The expression "at least one" modifies the entirety of a list of elements, and does not individually modify the elements. For example, the expression "at least one of A, B or C" indicates only A, only B, only C, both A and B, both B and C, both A and C, all of A, B, and C, or variations thereof.

Although the terms "first", "second", etc. may be used herein to describe various elements, these elements should not be limited by these terms. These terms are only used to distinguish one element from another element. For example, a first element may be referred to as a second element and, similarly, a second element may be referred to as a first element without departing from the scope of the disclosure. The term "and/or" refers to one of or a combination of at least two of a plurality of listed items.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units".

As used herein, AUTOSAR is an abbreviation for "automotive open system architecture" and refers to the open and standardized software architecture of electronic control units (ECUs) of a vehicle. This standard was developed through collaboration of interested parties to construct a scalable architecture compatible with vehicles of different manufacturers and electronic components of different suppliers. Using an AUTOSAR application programming interface (API), a network may interact with elements of a vehicle.

As used herein, inter-process communication (IPC) refers to a communication method by which processes communicate with each other and synchronize operations thereof. In IPC, when two or more processes run at the same time, a shared memory capable of sharing resources may be used. For example, a first process may run and the running result may be stored in the shared memory, and a second process may access the shared memory to use the running result of the first process. In IPC, a message for establishing a communication link from a process to another process may be transmitted. The message may be transmitted between communication links, and a head of the message may be used to determine a receiver and a process to be performed by the receiver.

As used herein, a distributed IPC facility (DIF) refers to a layer including IPC processes in a network system. Throughout the specification, a layer may also be referred to as an entity. DIF layers may perform the same processes with different policies or functions for higher level application processes. At the same time, the higher level application process may correspond to a DIF for a wider scope of services. Two applications with different end-hosts may communicate with each other through a DIF.

As used herein, a recursive internetwork architecture (RINA) refers to an IPC-based network architecture. In the RINA, DIFs are recursively applied to provide IPC services to each other. Unlike an existing network architecture following an OSI model, all DIF layers in the RINA do not have a fixed specific function but may perform the same function over different scopes and underlying media, and the number of layers may not be fixed. The DIF layers may be stacked or layered as required and may vary depending on a desired process or application needed.

As used herein, an electronic control unit (ECU) of a vehicle may control one or more electric systems or sub systems of the vehicle. The ECU may be embedded in an automotive system. In an embodiment of the disclosure, the ECU may include, for example, a door control unit (DCU), an engine control unit, a seat control unit, a speed control unit (SCU), a telematics control unit (TCU), a transmission control unit, a brake control module (BCM), a power train control module (PCM), and a battery management system (BMS), but is not limited thereto. For example, an ECU of a device connectable to the vehicle or the automotive system of the vehicle may also be included in the ECU.

As used herein, Ethernet is a technical standard used for, for example, a local area network (LAN), a wide area network (WAN), and a metropolitan area network (MAN). Ethernet may define signals and wiring in a physical layer of an OSI model, and media access control (MAC) packets and a protocol type in a data link layer.

Hereinafter, the disclosure will be described in detail by explaining embodiments of the disclosure with reference to the attached drawings. The disclosure may, however, be embodied in many different forms and should not be construed as being limited to the embodiments of the disclosure set forth herein. Specific executions described herein merely correspond to examples, and do not limit the scope of the disclosure in any way. For clarity of explanation, descriptions of general electronic elements, control systems, software, and other functional aspects of the systems may be omitted herein.

Reference will now be made in detail to embodiments of the disclosure, examples of which are illustrated in the accompanying drawings.

FIG. 1 is a block diagram of a system for communication between a source application and a destination application in a network, according to an embodiment of the disclosure.

Referring to FIG. 1, the system may include a first ECU 100 including a source application 102 and a library 104 having a protocol 106, a second ECU 120 including a destination application 122 and a library having a protocol, one or more high-level distributed IPC facilities (DIFs) 140 and 150, one or more low-level DIFs 161, 163, 165, 167, and 169, one or more routers 192, 194, 196, and 198, and one or more Ethernet switches 181, 182, 183, 184, 185, and 186 in an Ethernet layer. Although a communication layer is expressed as a DIF layer and a physical layer is expressed as an Ethernet layer herein, the communication layer may be a layer other than the DIF layer or the physical layer may be a layer other than the Ethernet layer. The routers 192, 194, 196, and 198 may include at least one of area border routers, a backbone router, an internal router, a designated router, or a backup designated router, but are not limited thereto.

The first and second ECUs 100 and 120 may be respectively called source and destination ECUs. In an embodiment of the disclosure, the first and second ECUs 100 and 120 may be units included in or connected to a vehicle. The first ECU 100 may be a unit for assisting a driver of the vehicle. For example, the first ECU 100 may be an advanced driver assistance system (ADAS) ECU, but is not limited thereto, and may be a mobile device or a remote device connected to the vehicle to control the vehicle. In an embodiment of the disclosure, the second ECU 120 may be a unit other than the first ECU 100. For example, the second ECU 120 may be a camera ECU, but is not limited thereto, and may be a sensor ECU, an airbag ECU, an engine ECU, a powertrain ECU, a transmission ECU, a battery management ECU, a body ECU, a driving safety system ECU, an information system ECU, or a hybrid vehicle (HV)/electric vehicle (EV) system ECU.

In an embodiment of the disclosure, the source application 102 may be an application for assisting the driver of the vehicle. For example, the source application 102 may be an ADAS application. In an embodiment of the disclosure, the destination application 122 may be an application other than the driver assistance system application, which is executed in the vehicle. For example, the destination application 122 may be a camera application, a sensor application, a door control application, a communication application, a dashboard application, or a gear application, but is not limited thereto and may be any application for controlling a system of the vehicle.

In an embodiment of the disclosure, the library 104 of the source application 102 may be an automotive open system architecture (AUTOSAR) library, and the protocol 106 of the AUTOSAR library may be a RINA protocol. The library of the destination application 122 may be an AUTOSAR library, and the protocol of the AUTOSAR library of the destination application 122 may be a RINA protocol.

According to an embodiment of the disclosure, the high-level DIFs 140 and 150 may be DIFs communicating with the source and destination applications 102 and 122. On the other hand, the low-level DIFs 161, 163, 165, 167, and 169 may be DIFs communicating with the high-level DIFs 140 and 150 or the Ethernet switches 181, 182, 183, 184, 185, and 186 of the Ethernet layer. Processes for the high-level DIFs 140 and 150 may be specified based on an application of an ECU communicating with the high-level DIFs 140 and 150, and processes for the low-level DIFs 161, 163, 165, 167, and 169 may be simple processes such as forwarding and blocking of messages, but are not limited thereto.

In an embodiment of the disclosure, the low-level DIFs 161, 163, 165, 167, and 169 may serve as a firewall for forwarding or blocking a message to the Ethernet layer and a high-level DIF or from a high-level DIF. The low-level DIFs 161, 163, 165, 167, and 169 may operate as a firewall to filter a connection between an Ethernet layer and a DIF layer and intercept data transmitted to or received from an application. The filtering process may be performed in units of a process or a port.

According to an embodiment of the disclosure, all DIFs may be interconnected by a backbone DIF 155 in the backbone router 196. The backbone DIF 155 may enable communication between different DIFs of the network. The backbone router 196 may be located in a backbone switch for sequentially and physically interconnecting all ECUs through the Ethernet switches 181, 182, 183, 184, 185, and 186. An Ethernet switch may be connected to a plurality of ECUs. For example, in an in-vehicle network, an ADAS ECU and a lighting controller may be connected to a dashboard Ethernet switch.

According to an embodiment of the disclosure, each DIF may have an address. For communication between two applications, the two applications may have a common DIF. When two applications do not have a common DIF, the two applications may be connected to an existing DIF or create a new DIF layer to have a common DIF. According to an embodiment of the disclosure, because applications not having a common DIF may not communicate with each other, unlike an existing architecture in which all applications need to know their network address and be connected to the address to perform communication, external access may be restricted in an embodiment of the disclosure.

According to an embodiment of the disclosure, each DIF may be a securable container capable of implementing an autonomous authentication, encryption, and trust mechanism. Applications may be registered in a common DIF to communicate with each other. The applications registered in the common DIF may communicate with a desired destination application by using a name of the destination application. Unlike an architecture in which communication is performed using a network address of an application, a port number may be assigned for an application, e.g., a source application which desires to communicate with a destination application, in an embodiment of the disclosure. The port number may be dynamically assigned. According to an embodiment of the disclosure, an address of an application is not exposed to a lower layer and thus vulnerability to targeted attacks may be reduced. In an embodiment of the disclosure, an authentication credential may be used to communicate with the destination application. For example, for additional security, a name of an application may be encrypted and be transmitted together with an authentication key.

According to an embodiment of the disclosure, by using a security mechanism inherent in a network design, rather than a specific security mechanism, security may be enhanced using a dynamically assigned port and address without using a known port or a public address.

Figure 2:
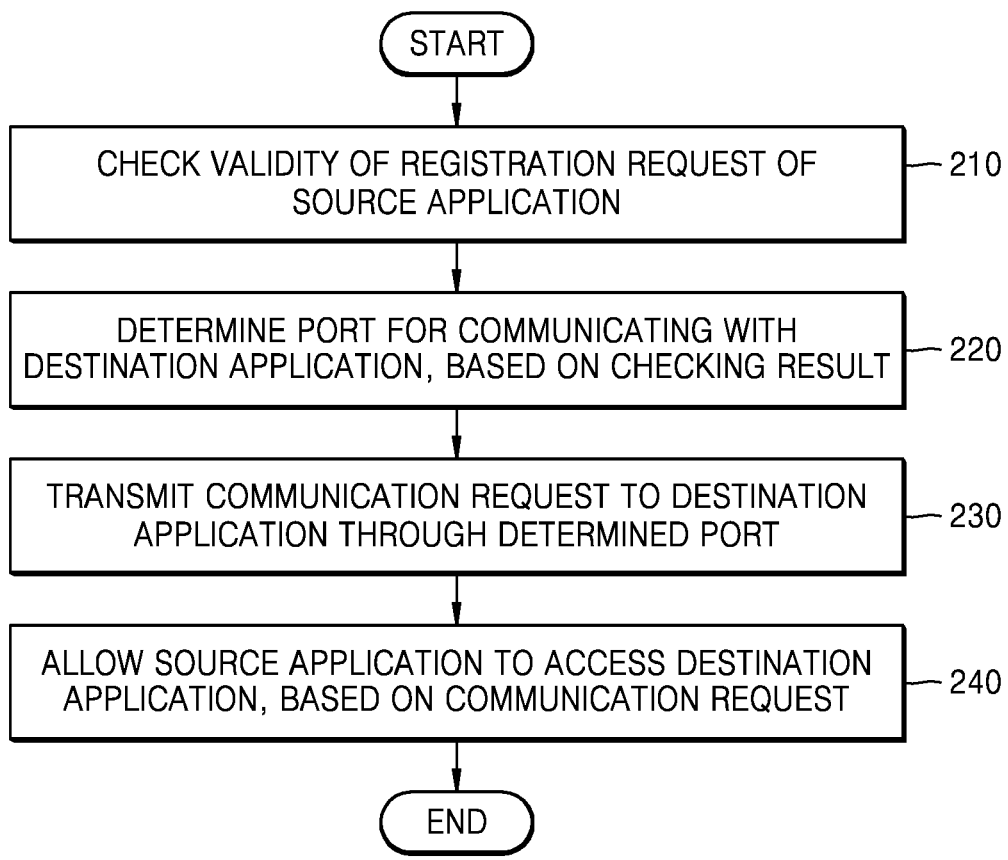
FIG. 2 is a flowchart of a method for communication between a source application and a destination application, according to an embodiment of the disclosure.

FIG. 2 is a flowchart of a method for communication between a source application and a destination application, according to an embodiment of the disclosure.

The method for communication between the source application and the destination application may be performed by an electronic device. The electronic device may be the system of FIG. 1, or a part of the system. For example, the electronic device may be the first ECU 100 of the system of FIG. 1, but is not limited thereto. According to an embodiment of the disclosure, the destination application may be an application operating in the same electronic device as or in a different electronic device from the source application. For example, referring to FIG. 1, the source application may operate in the first ECU 100, and the destination application may operate in the second ECU 120.

In operation 210, the electronic device may check the validity of a registration request of the source application. According to an embodiment of the disclosure, when the registration request is received, the electronic device may register the source application through a first library. A network in which the source application is registered may be a DIF to which both first and second ECUs are connected, but is not limited thereto. The first library used to register the source application in the network may be an AUTOSAR library of the first ECU, but is not limited thereto.

In an embodiment of the disclosure, the registration request may include at least one of a name of the destination application or a desired quality of service (QoS). The electronic device may transmit the registration request from the first library to a second library of the source application, and the second library of the source application may check the validity of the received registration request.

According to an embodiment of the disclosure, the second library for checking the validity of the received registration request may be a RINA library having a RINA protocol, but is not limited thereto. The first ECU may communicate with an external device, for example, by registering the source application in the network through the first library and communicate with the destination application of the second ECU, which has a common DIF with the source application, for example, by checking the registration request through the second library.

The first and second libraries may be divided depending on functions thereof, or a single library may serve as both the first and second libraries. The functions of each of the first and second libraries may also be performed by a plurality of sub-libraries.

According to an embodiment of the disclosure, the first library of the source application may be an AUTOSAR library, and the second library of the source application may be a RINA library. When the registration request is received, the electronic device may register the source application in the network through the AUTOSAR library. When the source application is registered in the network, the electronic device may transmit the registration request from the AUTOSAR library to the RINA library. The RINA library may check the validity of the received registration request. When the registration request is not valid, the method may be terminated in operation 210.

In operation 220, the electronic device may determine a port for communication between the source application and the destination application, based on the result of checking the validity of the registration request in operation 210. When the port is determined, the electronic device may use a dynamic routing table to dynamically assign a port number. Upon determining that the registration request is valid, the second library of the source application may return a port identifier of the source application.

For example, upon determining that the registration request is valid, the RINA library serving as the second library of the source application may return the port number obtained by dynamically assigning the port of the source application. The electronic device may perform operation 230 by using the returned port number.

In operation 230, the electronic device may transmit a communication request to the destination application through the determined port. The communication request may be transmitted from the source application to the destination application through the port determined in operation 220, and the first library of the source application. The second library of the source application may receive the communication request from the first library of the source application and recursively transmit the communication request to one or more low-level DIFs until the communication request reaches a physical layer. Until the communication request having reached the physical layer is received by a destination ECU, the electronic device may recursively transmit the communication request to one or more intermediate switches. As such, the communication request may be transmitted to the destination application and a first library of the destination application.

The first library of the destination application may be an AUTOSAR library corresponding to the first library of the source application, but is not limited thereto. A second library of the destination application may be a RINA library corresponding to the second library of the source application, but is not limited thereto.

In an embodiment of the disclosure, the first and second libraries of the destination application may respectively have the same protocols as the first and second libraries of the source application.

In operation 240, the electronic device may allow, enable, and/or control the source application to access the destination application based on the communication request. After the source application accesses the destination application, the source application may communicate with the destination application.

Figure 3:
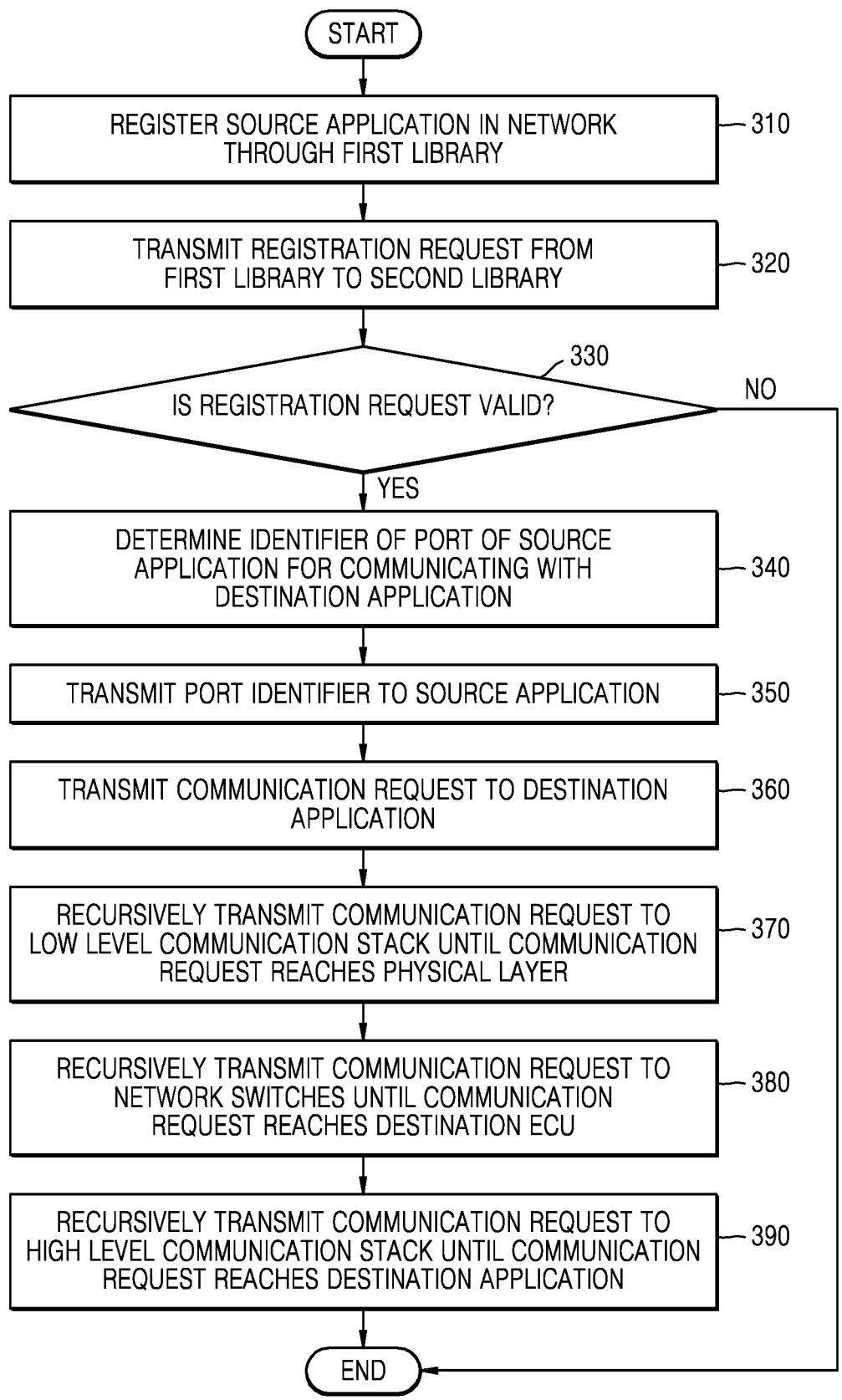
FIG. 3 is a flowchart of a method for communication between applications in a network operating based on a recursive network architecture, according to an embodiment of the disclosure.

FIG. 3 is a flowchart of a method for communication between applications in a network operating based on a recursive network architecture, according to an embodiment of the disclosure.

In operation 310, an electronic device may register a source application in a network through a first library. For example, the electronic device may be a device in a vehicle and the first library may be an AUTOSAR library. In this case, the electronic device may register the source application in the network through the AUTOSAR library, based on a registration request. Therefore, the electronic device may exchange information with other automotive elements satisfying the AUTOSAR standard. Ethernet hardware has an Ethernet backbone and thus may support a RINA network. Elements not having such hardware configuration (e.g., legacy automotive elements) may be connected to the RINA network by using another gateway conforming to the AUTOSAR standard.

For example, for a function such as lane departure warning, an ADAS system may rely heavily on an input from an imaging system of a vehicle. In this case, an ADAS source application needs to be able to communicate with a camera application in an automotive system. To communicate with the camera application serving as a destination application, the ADAS source application may be preliminarily registered in the AUTOSAR library based on the registration request through an AUTOSAR runtime environment (RTE), in order to be registered in the network. The registration request may include a name of the destination application and optionally a desired Quality of Service (QoS).

In operation 320, the electronic device may transmit the registration request from the first library to a second library. For example, the electronic device may transmit the registration request from the AUTOSAR library to a RINA library of the source application.

In operation 330, the electronic device may determine whether the registration request is valid. According to an embodiment of the disclosure, the second library of the source application may determine whether the registration request is valid, and register the source application in a communication layer. Upon determining that the registration request is not valid, the electronic device may terminate the communication process. Upon determining that the registration request is valid, the electronic device may continue the communication process for communication between the source application and the destination application. For example, the RINA library having received the registration request from the AUTOSAR library may check the validity of the registration request and register the source application in a RINA DIF, based on the checking result.

In operation 340, the electronic device may determine a port of the source application for communicating with the destination application, and a port identifier corresponding to the port. According to an embodiment of the disclosure, the electronic device may dynamically assign the port of the source application for communicating with the destination application. The port identifier such as a port number may be determined using a dynamic routing table. Therefore, a system may require only the name of the destination application to assign an empty port for the source application. As such, vulnerability to network attacks from outside may be reduced by removing the necessity for a known port and a public address by using a dynamically assigned port and an identifier of the port. In addition, a system may use a smaller routing table such that routing overhead may be reduced and network performance may be improved. According to an embodiment of the disclosure, the port identifier may be a port number, a port name, a port address, or the like, but is not limited thereto.

For example, an application of an engine control unit in an automotive system may communicate with almost all the other applications for driving safety and road safety. In an existing network architecture, an application receives data from only one port. This may bring delays of the data and influence processing of the data to cause potential risks. Using a RINA, the flow of data may be assigned for all ports. This may remove the necessity for designation of a known port and a public address at which network attacks are easily targeted.

In operation 350, the electronic device may transmit the port identifier to the source application. In operation 360, the electronic device may transmit a communication request to the destination application. According to an embodiment of the disclosure, the source application may transmit the communication request to the destination application through a port corresponding to the received port identifier.

In operation 370, until the communication request reaches a physical layer, the electronic device may recursively transmit the communication request to low-level communication layers. According to an embodiment of the disclosure, the electronic device may recursively transmit the communication request received by the second library of the source application, to one or more communication layers until the communication request reaches the physical layer such as an Ethernet layer. For example, until the communication request reaches the Ethernet layer, the communication request may be recursively transmitted to one or more low-level RINA DIFs though the RINA library of the source application.

In operation 380, until the communication request reaches a destination ECU, the electronic device may recursively transmit the communication request to network switches. For example, intermediate Ethernet switches serving as RINA routers from the Ethernet layer may forward the communication request until the communication request reaches the destination ECU.

In operation 390, until the communication request reaches the destination application, the electronic device may recursively transmit the communication request to high-level communication layers. For example, a RINA library of the destination ECU may recursively forward the communication request to high-level RINA DIFs connected to the destination ECU, until the communication request reaches an AUTOSAR library for forwarding the communication request to the destination application. The AUTOSAR library may forward the communication request to the destination application.

Figure 4:
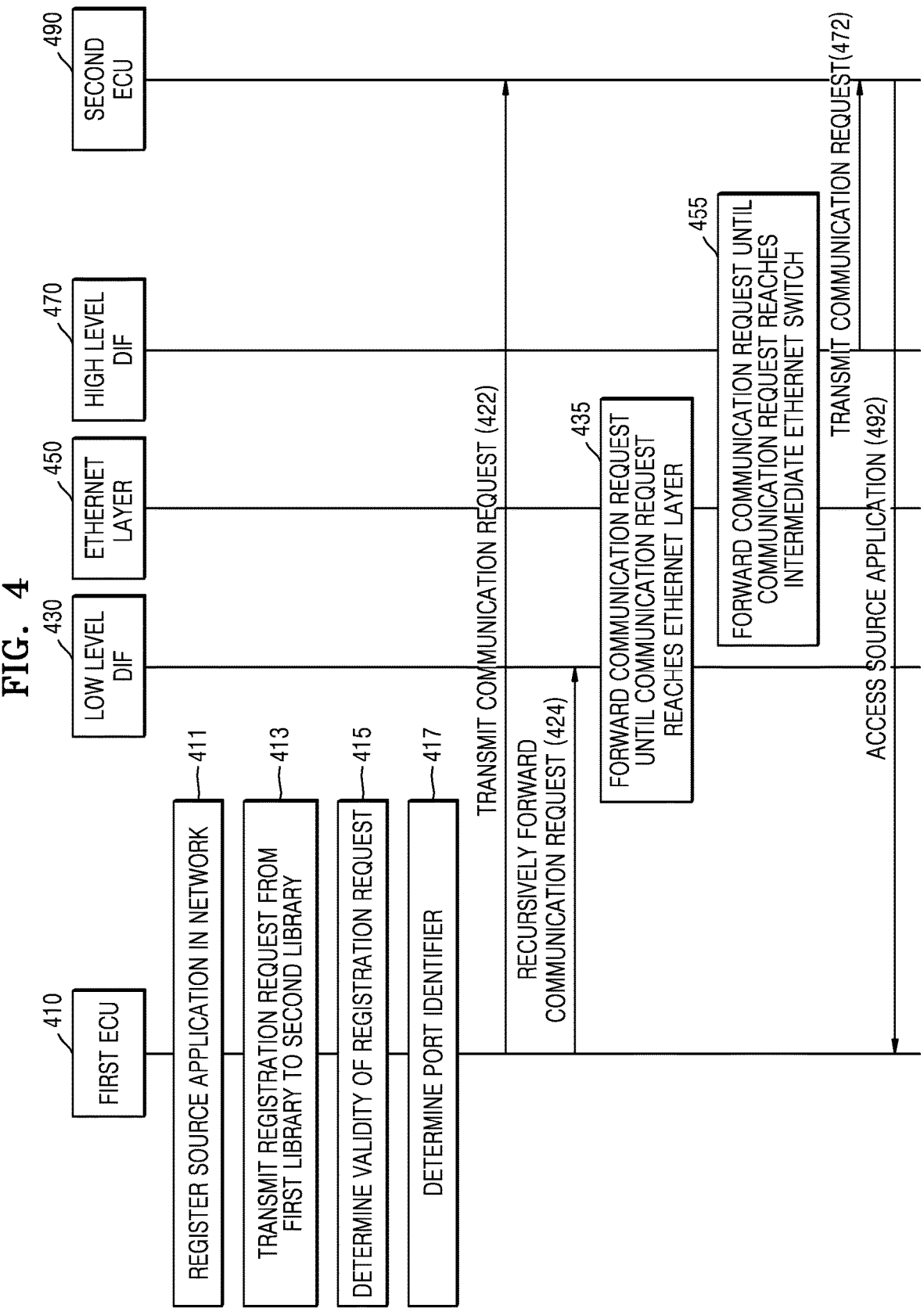
FIG. 4 is a flowchart of a method for communication between a first electronic control unit (ECU) and a second ECU, according to an embodiment of the disclosure.

FIG. 4 is a flowchart of a method for communication between a first ECU 410 and a second ECU 490, according to an embodiment of the disclosure.

In operation 411, the first ECU 410 may register a source application in a network through a first library of the source application, based on a registration request to communicate with the second ECU 490. In operation 413, the first ECU 410 may transmit the registration request from the first library to a second library. According to an embodiment of the disclosure, in operation 415, the second library of the source application may determine the validity of the received registration request. When the second library determines that the registration request is valid, the first ECU 410 may dynamically assign a port. As such, in operation 417, the second library may determine a port identifier of the dynamically assigned port and return the port identifier to the source application. In operation 422, the source application may receive the port identifier and transmit a communication request to a destination application of the second ECU 490 through a port corresponding to the port identifier.

According to an embodiment of the disclosure, the communication request transmitted from the source application of the first ECU 410 to the destination application of the second ECU 490 may pass through at least one of one or more low-level DIFs 430, one or more Ethernet layers 450, or one or more high-level DIFs 470. According to an embodiment of the disclosure, in operation 424, the first ECU 410 may recursively forward the communication request to the low-level DIFs 430. In operation 435, the communication request may be forwarded until the communication request reaches the Ethernet layers 450. In an embodiment of the disclosure, the Ethernet layers 450 may be Ethernet switches, and a name of the destination application of the second ECU 490 may be encrypted and transmitted. In operation 455, the communication request may be forwarded until the communication request reaches intermediate Ethernet switches. In operation 472, the communication request may be transmitted from the high-level DIFs 470 to the destination application of the second ECU 490. The second ECU 490 may access the source application of the first ECU 410 based on the received communication request.

For example, the first ECU 410 may be an ADAS, and the second ECU 490 may be an ECU of a camera system. According to an embodiment of the disclosure, an application of the ADAS may run on a RINA network. The ADAS may be a system for assisting a driver to increase driving safety of a vehicle and road safety. The ADAS system may use an automotive system such as an ECU, a brake management system, an imaging system, and an engine control unit to perform specific functions such as electronic stability control, lane departure warning, cruise control, and traction control, but the system is not limited thereto. For example, for a function such as lane departure warning, the ADAS may rely heavily on an input from an imaging system of a vehicle. In this case, an ADAS source application may communicate with a camera application in an automotive system. To communicate with the camera application serving as a destination application, the ADAS source application may be registered in a network. When the registration request is received, the ADAS source application may be preliminarily registered in an AUTOSAR library through an AUTOSAR RTE, in order to be registered in the network. According to an embodiment of the disclosure, the registration request may include a name of the destination application and optionally the desired QoS. According to an embodiment of the disclosure, the AUTOSAR library may transmit the registration request to a RINA library. According to an embodiment of the disclosure, the RINA library may check the validity of the registration request, register the source application in a corresponding RINA DIF, and return a port number of the source application corresponding to the port identifier, to communicate with the destination application. The source application may transmit the communication request to the destination application by using the returned port number. The AUTOSAR library may transmit the communication request to the RINA library, and the RINA library may recursively transmit the communication request to the low-level DIFs 430 until the communication request reaches the Ethernet layers 450. The intermediate Ethernet switches serving as RINA routers from the Ethernet layers 450 may forward the communication request until the communication request reaches the second ECU 490. A RINA library of the second ECU 490 may recursively transmit the communication request to the high-level DIFs 470 until the communication request reaches an AUTOSAR library, and the AUTOSAR library of the second ECU 490 may transmit the communication request to the destination application.

Figure 5:
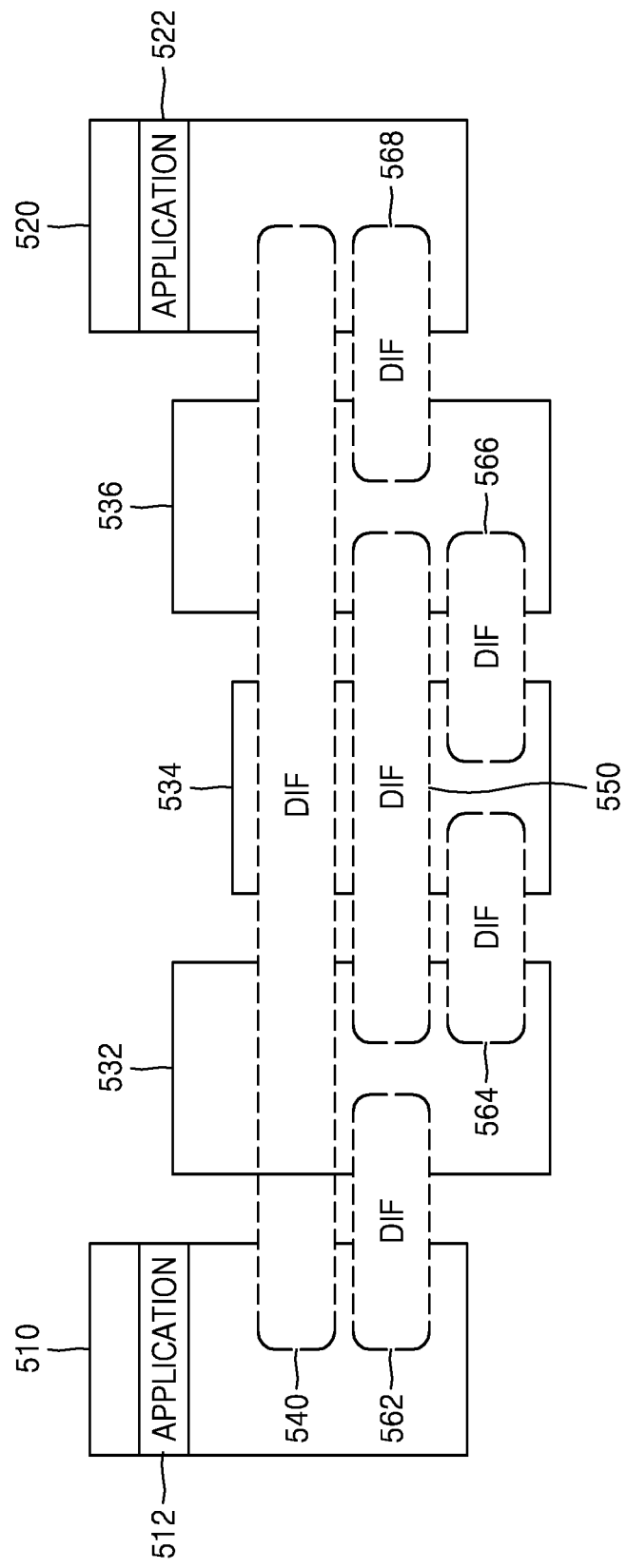
FIG. 5 is a block diagram for describing a recursive internetwork architecture (RINA) according to an embodiment of the disclosure.

FIG. 5 is a block diagram for describing a RINA architecture according to an embodiment of the disclosure.

Referring to FIG. 5, an application 512 may use a RINA network including one or more DIFs 540, 550, 562, 564, 566, and 568, to communicate with another application 522 on the RINA network. According to an embodiment of the disclosure, the RINA is one of IPC models and may be an architecture including a single recurring set of layers called distributed IPC facilities or DIFs. A network designer may design the network with a desired number of DIFs. Unlike an existing network architecture in which a layer is determined in units of a module, the RINA network may use a desired number of DIFs performing the same function in different ranges. According to an embodiment of the disclosure, the RINA may include nodes such as hosts 510 and 520, area border routers 532 and 536, and an internal router 534, but is not limited thereto.

For example, a high-level DIF 540 may be directly connected to the two hosts 510 and 520. Each of low-level DIFs 562, 564, 566, and 568 may be connected via a host and a router, or connected between a plurality of routers. The low-level DIFs 562, 564, 566, and 568 may serve as a firewall for enhancing security in communication on the RINA network.

Figure 6:
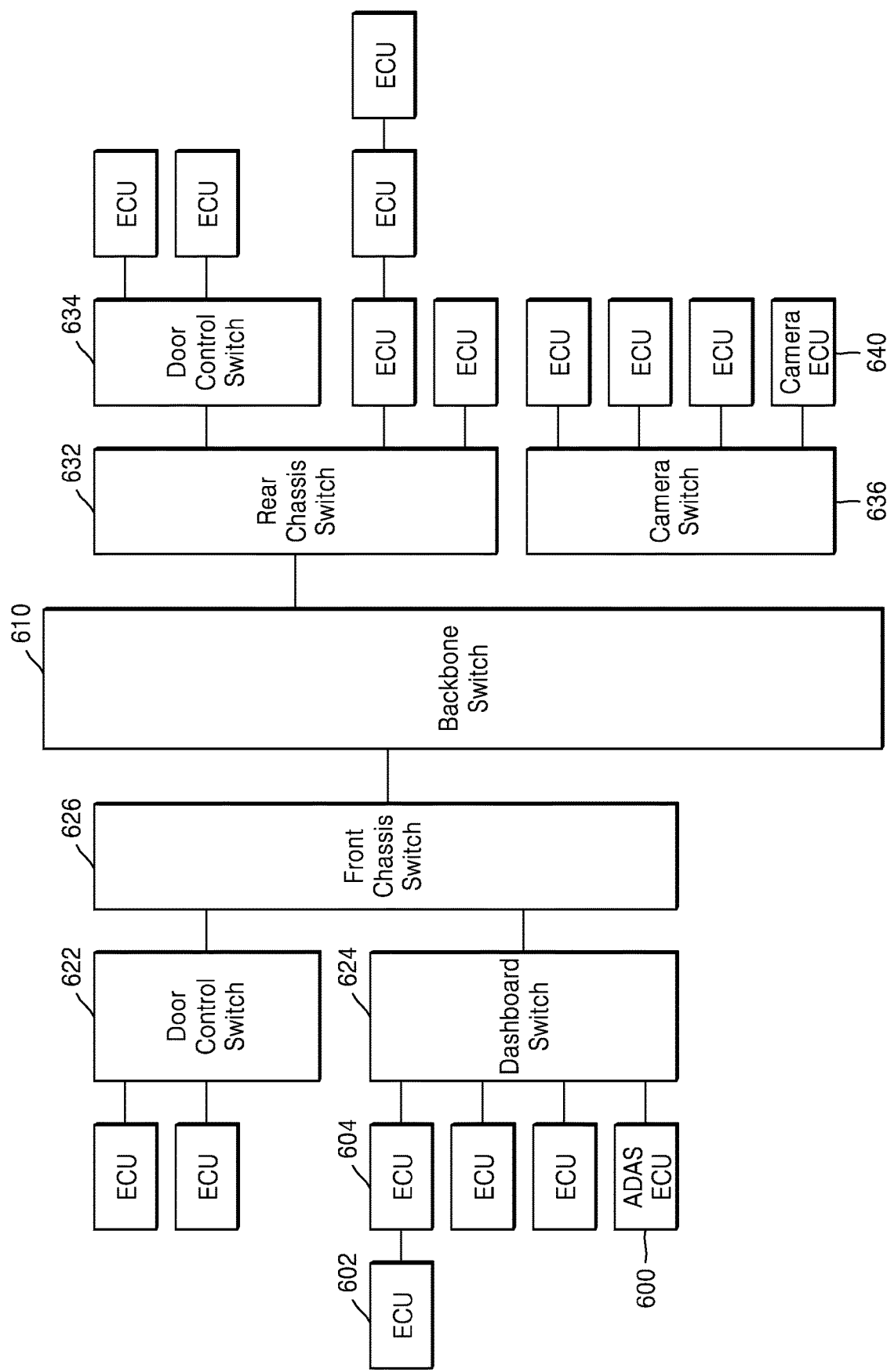
FIG. 6 is a block diagram showing a network topology in an in-vehicle network, according to an embodiment of the disclosure.

FIG. 6 is a block diagram showing a network topology in an in-vehicle network, according to an embodiment of the disclosure.

Referring to FIG. 6, the in-vehicle network topology may include at least one of a backbone switch 610, one or more door control switches 622 and 634, a front chassis switch 626, a rear chassis switch 632, a dashboard switch 624, a camera switch 636, or one or more ECUs 600, 602, 604, and 640. The ECUs 600, 604, and 640 may be connected to one or more switches, and the ECU 602 may be connected to another ECU 604. The backbone switch 610 may be a central element for interconnecting different network elements. As such, the backbone switch 610 may facilitate network routing and management.

For example, a case in which an ADAS ECU 600 communicates with a camera ECU 640 may be considered. A message may initially pass through switches such as the dashboard switch 624 and the front chassis switch 626. The message may be forwarded to the camera switch 636 through the backbone switch 610. According to an embodiment of the disclosure, an element not having an Ethernet function and conforming to the AUTOSAR standard may be connected to the network through a gateway. Therefore, the topology may construct an integrated network with Ethernet as a main physical medium. As such, costs may be reduced by minimizing use of a gateway and implementation of another high-priced sub-network. This may also allow other compatible ECUs to be easily connected to the network based on the minimum settings and configuration.

According to an embodiment of the disclosure, by simplifying and integrating a whole network topology into a single network, a high bandwidth provided by a physical layer such as an Ethernet layer may be more effectively used.

Figure 7:
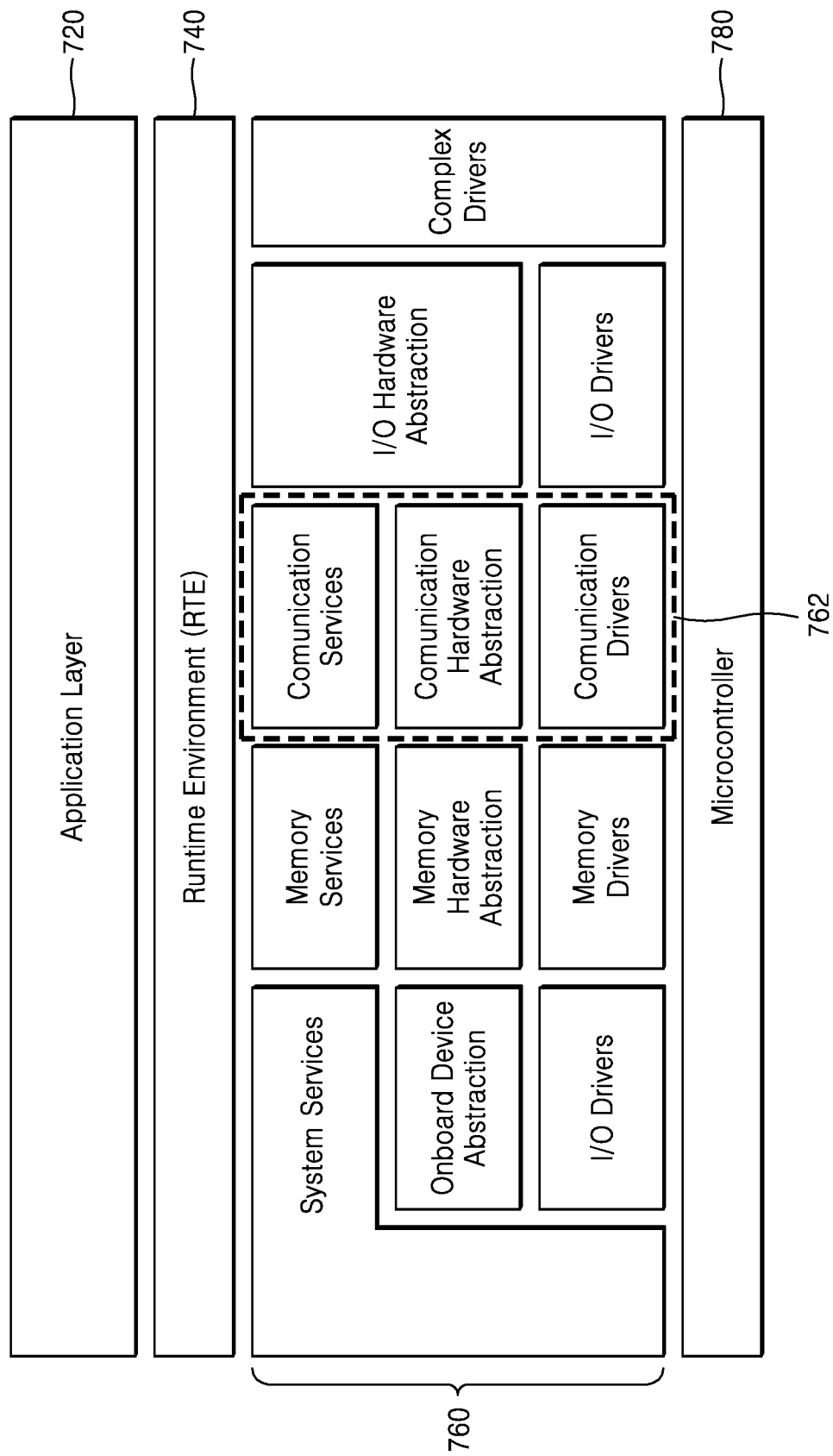
FIG. 7 is a block diagram showing an architecture of a communication stack according to an embodiment of the disclosure.

FIG. 7 is a block diagram showing an architecture of a communication stack according to an embodiment of the disclosure.

Referring to FIG. 7, the communication stack according to an embodiment of the disclosure may include a microcontroller abstraction layer (MCAL) 780, a basic software layer 760, an RTE 740, and an application layer 720. However, the communication stack. may include a additional or fewer elements compared to those illustrated in FIG. 7.

According to an embodiment of the disclosure, the basic software layer 760 may include, for example, system services, input/output (I/O) drivers, memory services, a memory hardware abstraction layer, memory drivers, communication services, a communication hardware abstraction layer, communication drivers, and an I/O hardware abstraction layer, but is not limited thereto. According to an embodiment of the disclosure, a protocol may be integrated with a communication stack 762. Due to such integration, an application and a system may communicate with a network. For example, a RINA protocol may be integrated with a communication stack of an AUTOSAR architecture, and an AUTOSAR application and a system may communicate with a RINA network. In addition, an application not connected to an Ethernet layer may communicate with another application while running on the AUTOSAR.

Figure 8:
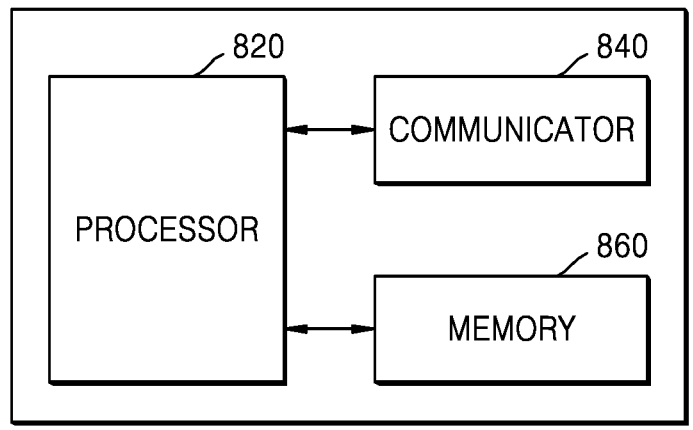
FIG. 8 is a block diagram of an electronic device according to an embodiment of the disclosure.

FIG. 8 is a block diagram of an electronic device 800 according to an embodiment of the disclosure.

The electronic device 800 may be an automobile, an automotive element, an ECU of a vehicle, a smartphone, a personal computer (PC), a tablet PC, a smart television (TV), a mobile phone, a personal digital assistant (PDA), a laptop computer, a media player, a microserver, a global positioning system (GPS) device, an e-book reader, a digital broadcast receiver, a navigation system, a kiosk, an MP3 player, a digital camera, a home appliance, or another mobile or non-mobile computing device, but is not limited thereto. Alternatively, the electronic device 800 may be a wearable device, e.g., a watch, glasses, a hairband, or a ring, which have a communication function and a data processing function.

Referring to FIG. 8, the electronic device 800 may include a processor 820, a communicator 840, and a memory 860. However, the electronic device 800 may include additional or fewer elements compared to those illustrated in FIG. 8.

In an embodiment of the disclosure, the processor 820 may control overall operations of the electronic device 800 and include at least one processor such as a central processing unit (CPU) or a graphics processing unit (GPU). The processor 820 may control the other elements of the electronic device 800 to perform operations for operating the electronic device 800. For example, the processor 820 may execute a program stored in, read a file stored in, or store a new file in the memory 860. In an embodiment of the disclosure, the processor 820 may perform operations for operating the electronic device 800, by executing a program of computer-readable instructions or computer-readable code stored in the memory 860. For example, the processor 820 may check the validity of a registration request of a source application for communicating with a destination application, determine a port for communicating with the destination application, based on the checking result, transmit a communication request to the destination application through the determined port, and allow the source application to access the destination application based on the communication request.

In an embodiment of the disclosure, the communicator 840 may allow the electronic device 800 to communicate with another electronic device through the communicator 840 in a wired or wireless manner. For example, through the communicator 840, an application of an ADAS device in a vehicle may communicate with and receive image data from an application of a camera device in the vehicle. The communicator 840 may include one or more elements for enabling communication with an external server (e.g., a social networking service (SNS) server, a cloud server, or a content providing server) and another external device. For example, the communicator 840 may include a short-range wireless communicator, a mobile communicator, and a broadcast receiver. According to an embodiment of the disclosure, the communicator 840 may receive data from an external device or server and provide the received data to the processor 820.

In an embodiment of the disclosure, the memory 860 may store various data, programs, or applications for driving and controlling the electronic device 800. The program stored in the memory 860 may include one or more instructions. The program (e.g., one or more instructions) or application stored in the memory 860 may be executed by the processor 820. The memory 860 may store data input to or to be output from the electronic device 800. The processor 820 may access and use the data stored in the memory 860, or store new data in the memory 860.

Embodiments of the disclosure may be implemented in the form of a computer-readable recording medium including instructions executable by a computer, e.g., a program module executed by a computer. The computer-readable recording medium may be an arbitrary available medium accessible by a computer, and examples thereof include all volatile, non-volatile, detachable, and non-detachable media. The computer-readable recording medium may include a computer storage medium. Examples of the computer storage medium include all volatile, non-volatile, detachable, and non-detachable media implemented using an arbitrary method or technology for storing information such as computer-readable instructions, data structures, program modules, or other data.

Embodiments of the disclosure may be implemented as software programs including instructions stored in computer-readable storage media.

A computer that is a device for fetching instructions stored in a storage medium and performing an operation according to the fetched instructions may include an electronic device according to embodiments of the disclosure.

A computer-readable storage medium may be provided as a non-transitory storage medium. When a storage medium is 'non-transitory', it means that the storage medium does not include a signal and is tangible, and it does not limit that data is semi-permanently or temporarily stored in the storage medium.

Also, a control method according to embodiments of the disclosure may be included and provided in a computer program product. The computer program product may be traded between a seller and a buyer.

The computer program product may include a software program and a computer-readable storage medium storing a software program. For example, the computer program product may include a product (e.g., a downloadable application) that is electronically distributed in the form of a software program through a device manufacturer or an electronic market (e.g., Google Play Store or App Store). For electronic distribution, at least a part of the software program may be stored in a storage medium or be temporarily created. In this case, the storage medium may be a server of the manufacturer, a server of the electronic market, or a storage medium of a relay server that temporarily stores the software program.

The computer program product may include a storage medium of a server or a storage medium of a device in a system including the server and the device. Otherwise, when a third device (e.g., a smartphone) communicating with the server or the device is present, the computer program product may include a storage medium of the third device. Alternatively, the computer program product may include a software program itself transmitted from the server to the device or the third device, or from the third device to the device.

In this case, one of the server, the device, and the third device may perform the method according to embodiments of the disclosure, by executing the computer program product. Alternatively, two or more of the server, the device, and the third device may perform the method according to embodiments of the disclosure, by executing the computer program product.

For example, the server (e.g., a cloud server or an artificial intelligence (AI) server) may control the device connected to the server, to perform the method according to embodiments of the disclosure, by executing the computer program product stored in the server.

As another example, the third device may control the device connected to the third device, to perform the method according to embodiments of the disclosure, by executing the computer program product. When the third device executes the computer program product, the third device may download the computer program product from the server and execute the downloaded computer program product. Alternatively, the third device may perform the method according to embodiments of the disclosure, by executing the computer program product provided in a preloaded state.

As used herein, a suffix "unit" or "—er/or" may indicate a hardware component such as a processor or a circuit, and/or a software component executed by the hardware component such as the processor.

According to an embodiment of the disclosure, by simplifying and integrating a whole network topology into a single network, a high bandwidth provided by a physical layer such as an Ethernet layer may be more effectively used.

Furthermore, according to an embodiment of the disclosure, an electronic device may easily exchange information with another electronic device.

In addition, according to an embodiment of the disclosure, by using a security mechanism inherent in a network design, rather than a specific security mechanism, security may be enhanced using a dynamically assigned port and address without using a known port or a public address.

Besides, according to an embodiment of the disclosure, costs for communication between devices may be reduced by implementing a network through simple wiring using a physical layer such as an Ethernet layer.

Additional aspects, features, and advantages of embodiments of the disclosure will be more apparent from the aforementioned descriptions taken in conjunction with the accompanying drawings.

The above descriptions of the disclosure are provided for the purpose of illustration, and it will be understood by one of ordinary skill in the art that various changes in form and details may be made therein without departing from the scope of the disclosure. Therefore, it should be understood that embodiments of the disclosure described herein should be considered in a descriptive sense only and not for purposes of limitation. For example, each component described to be of a single type can be implemented in a distributed manner and, likewise, components described as being distributed can be implemented in a combined manner.

The scope of the disclosure is defined by the following claims rather than by the detailed description, and it should be understood that all modifications from the claims and their equivalents are included in the scope of the disclosure.

What is claimed is:

1. An electronic device of a vehicle, the electronic device comprising:
   a memory storing one or more instructions; and
   at least one processor configured to execute the one or more instructions to:
   check validity of a registration request of a source application of the vehicle for communicating with a destination application of the vehicle,
   dynamically determine a port for the source application of the vehicle to communicate with the destination application of the vehicle, based on the validity of the registration request,
   transmit a communication request from the source application of the vehicle to the destination application of the vehicle through the port, and
   control communication between the source application of the vehicle and the destination application of the vehicle based on the communication request,
   wherein the at least one processor is further configured to execute the one or more instructions to recursively transmit the communication request to one or more Ethernet switches until the communication request reaches a processor for controlling the destination application of the vehicle.

2. The electronic device of claim 1, wherein the registration request comprises at least one of a name of the destination application of the vehicle or a desired quality of service (QoS).

3. The electronic device of claim 1, wherein the at least one processor is further configured to execute the one or more instructions to register the source application of the vehicle in a network through a first library of the source application of the vehicle based on the registration request.

4. The electronic device of claim 1, wherein the at least one processor is further configured to execute the one or more instructions to recursively forward the communication request to one or more communication stacks until the communication request reaches a physical layer.

5. The electronic device of claim 1, wherein the at least one processor is further configured to execute the one or more instructions to dynamically determine the port.

6. The electronic device of claim 5, wherein the at least one processor is further configured to execute the one or more instructions to determine a port identifier indicating the port, and
wherein the port identifier indicating the port comprises a port number dynamically assigned by a second library of the source application of the vehicle.

7. The electronic device of claim 1, wherein the at least one processor is further configured to execute the one or more instructions to transmit the registration request from a first library of the source application of the vehicle to a second library of the source application of the vehicle.

8. The electronic device of claim 1, wherein the registration request comprises an encrypted name of the destination application of the vehicle and an authentication key.

9. The electronic device of claim 1, further comprising a communicator configured to communicate with an external device.

10. A method comprising:
checking validity of a registration request of a source application of a vehicle for communicating with a destination application of the vehicle;
dynamically determining a port for the source application of the vehicle to communicate with the destination application of the vehicle, based on the validity of the registration request;
transmitting a communication request from the source application of the vehicle to the destination application of the vehicle through the port; and
controlling communication between the source application of the vehicle and the destination application of the vehicle based on the communication request,
wherein the transmitting comprises recursively transmitting the communication request to one or more Ethernet switches until the communication request reaches a processor for controlling the destination application of the vehicle.

11. The method of claim 10, wherein the registration request comprises at least one of a name of the destination application of the vehicle or a desired quality of service (QoS).

12. The method of claim 10, further comprising registering the source application of the vehicle in a network through a first library of the source application of the vehicle based on the registration request.

13. The method of claim 10, wherein the transmitting comprises recursively forwarding the communication request to one or more communication stacks until the communication request reaches a physical layer.

14. The method of claim 10, further comprising dynamically determining the port.

15. The method of claim 14, further comprising determining a port identifier indicating the of the vehicle port,
wherein the port identifier indicating the of the vehicle port comprises a port number dynamically assigned by a second library of the source application of the vehicle.

16. The method of claim 10, wherein the registration request comprises an encrypted name of the destination application of the vehicle and an authentication key.

17. The method of claim 10, further comprising transmitting the registration request from a first library of the source application of the vehicle to a second library of the source application of the vehicle.

18. A non-transitory recording medium having recorded thereon a program, which when executed by an electronic device of a vehicle controls the electronic device to execute a method of controlling communication between applications of the vehicle, the method comprising:
checking validity of a registration request of a source application of the vehicle for communicating with a destination application of the vehicle;
dynamically determining a port for the source application of the vehicle to communicate with the destination application of the vehicle, based on the validity of the registration request;
transmitting a communication request from the source application of the vehicle to the destination application of the vehicle through the port; and
controlling communication between the source application of the vehicle and the destination application of the vehicle based on the communication request,
wherein the transmitting comprises recursively transmitting the communication request to one or more Ethernet switches until the communication request reaches a processor for controlling the destination application of the vehicle.

* * * * *